US012700549B2

(12) United States Patent
Summey et al.

(10) Patent No.: US 12,700,549 B2
(45) Date of Patent: Aug. 4, 2026

(54) CAPACITOR AND PROCESS FOR FORMING ELECTRICAL CONNECTIONS THEREIN

(71) Applicant: KEMET Electronics Corporation, Fort Lauderdale, FL (US)

(72) Inventors: Brandon K. Summey, Simpsonville, SC (US); Jeffrey Poltorak, Greenville, SC (US); Robert Andrew Ramsbottom, Simpsonville, SC (US); Kevin A. Agosto, Simpsonville, SC (US)

(73) Assignee: Kemet Electronics Corporation, Fort Lauderdale, FL (US)

( * ) Notice: Subject to any disclaimer, the term of this patent is extended or adjusted under 35 U.S.C. 154(b) by 333 days.

(21) Appl. No.: 18/367,242

(22) Filed: Sep. 12, 2023

(65) Prior Publication Data

US 2024/0096562 A1     Mar. 21, 2024

Related U.S. Application Data

(60) Provisional application No. 63/407,407, filed on Sep. 16, 2022.

(51) Int. Cl.
| | |
|---|---|
| *H01G 9/15* | (2006.01) |
| *H01G 9/00* | (2006.01) |
| *H01G 9/012* | (2006.01) |
| *H01G 9/042* | (2006.01) |
| *H01G 9/08* | (2006.01) |

(52) U.S. Cl.
CPC ........... *H01G 9/012* (2013.01); *H01G 9/0029* (2013.01); *H01G 9/0425* (2013.01); *H01G 9/08* (2013.01); *H01G 9/15* (2013.01)

(58) Field of Classification Search
None
See application file for complete search history.

(56) References Cited

U.S. PATENT DOCUMENTS

| | | | | |
|---|---|---|---|---|
| 6,346,127 B1 * | 2/2002 | Kuriyama | .............. | H01G 2/065 |
| | | | | 29/25.03 |
| 7,031,141 B2 * | 4/2006 | Kuriyama | ................ | H01G 9/14 |
| | | | | 361/540 |

(Continued)

FOREIGN PATENT DOCUMENTS

| | | | | | |
|---|---|---|---|---|---|
| JP | 2001307957 A | | 11/2001 | | |
| JP | 2006108274 A | * | 4/2006 | ............. | H01G 9/012 |
| WO | WO-2005096332 A1 | * | 10/2005 | ............. | H01G 9/042 |

OTHER PUBLICATIONS

Machine English translation of JP 2001307957A to Yamamoto et al.

*Primary Examiner* — Dion R. Ferguson
(74) *Attorney, Agent, or Firm* — Patterson + Sheridan, LLP

(57) ABSTRACT

Provided herein is an improved capacitor. The capacitor comprises a capacitor body comprising an anode, a dielectric on the anode and a cathode on the dielectric. At least two anode wires are in electrical contact with the anode and extending from the capacitor body. At least one anode node, or an anode node remnant, wherein each anode wire of the anode wires is in electrical contact with at least one anode node or anode remnant. An encapsulant encases the capacitor body. At least a portion of the anode node, or anode node remnant, is in electrical connection with an external termination. A cathode external termination is in electrical contact with the cathode.

40 Claims, 8 Drawing Sheets

(56) References Cited

U.S. PATENT DOCUMENTS

| | | | |
|---|---|---|---|
| 7,116,548 B2 * | 10/2006 | Satterfield, Jr. | H01G 9/042 |
| | | | 29/25.03 |
| 7,342,775 B2 * | 3/2008 | Hahn | H01G 9/14 |
| | | | 361/540 |
| 7,450,366 B2 * | 11/2008 | Kuriyama | H01G 9/012 |
| | | | 29/25.03 |
| 7,646,589 B2 * | 1/2010 | Kuriyama | H01G 9/012 |
| | | | 361/523 |
| 9,514,891 B2 * | 12/2016 | Djebara | H01G 9/0525 |
| 9,576,740 B2 * | 2/2017 | Shin | H01G 9/052 |
| 9,905,368 B2 * | 2/2018 | Djebara | H01G 9/0032 |
| 9,972,443 B2 * | 5/2018 | Cho | H01G 9/10 |
| 12,394,573 B2 * | 8/2025 | Cain | H01G 9/15 |
| 2004/0021534 A1 * | 2/2004 | Arai | H05K 1/0231 |
| | | | 333/204 |
| 2006/0285276 A1 * | 12/2006 | Kuriyama | H01G 9/012 |
| | | | 361/523 |
| 2009/0103243 A1 * | 4/2009 | Mizukoshi | H01G 9/052 |
| | | | 361/523 |
| 2014/0233157 A1 * | 8/2014 | Hahn | H01G 9/0425 |
| | | | 361/528 |
| 2016/0012970 A1 * | 1/2016 | Shin | H01G 9/008 |
| | | | 361/540 |
| 2016/0217935 A1 * | 7/2016 | Cho | H01G 9/10 |
| 2023/0078854 A1 * | 3/2023 | Guerrero | H01G 9/042 |
| | | | 361/528 |
| 2024/0096562 A1 * | 3/2024 | Summey | H01G 9/08 |

* cited by examiner

CAPACITOR AND PROCESS FOR FORMING ELECTRICAL CONNECTIONS THEREIN

CROSS-REFERENCE TO RELATED APPLICATIONS

The present application claims priority to pending U.S. Provisional Patent Application No. 63/407,407 filed Sep. 16, 2022 which is incorporated herein by reference.

FIELD OF THE INVENTION

The present invention is related to an improvement in the manufacture of capacitors and improved capacitors formed thereby. More specifically, the present invention is specific to improvements in the formation of solid electrolyte capacitors comprising multiple anode wires and improvements in the ability to connect the anode wires to an external termination.

BACKGROUND

Solid electrolyte capacitors are widely accepted in the art. Solid electrolytic capacitors comprise a capacitor body which functions as the capacitive couple wherein an anode of the capacitor body is typically formed by pressing a powder of a valve metal into the desired shape. An anode wire is attached to, or extends from, the anode. A dielectric is formed on the anode and a cathode is formed on the dielectric to form the capacitor body.

It is known in the art that multiple anode wires improve the equivalent series resistance (ESR) of a capacitor. The multiple anode wires are particularly advantageous, without limit thereto, when utilized with a fluted anode as described in U.S. Pat. No. 7,342,775. Unfortunately, it has proven difficult to attach multiple anode wires to a lead frame without disturbing the interface between the anode wires and the anode body. Therefore, many of the advantages expected for multiple anode wires is not realized due to poor adhesion of the anode wires to the lead frame or damage caused to the capacitive couple.

By way of example, FIGS. 1 and 2 schematically illustrate the relationship between a lead frame, 10, and the anode wires, 12, extending from a face, 14, of the anode and the capacitor body, 16. Due to normal manufacturing variation the anode wires are not all in contact with the lead frame and therefore it is not possible to form a weld unless the anode wires are distorted, the interface between the anode wires and the anode body is disturbed or the gap is somehow filled which is not practical. It is difficult in a manufacturing environment to form an anode with the anode wires extending therefrom, or attached thereto, wherein the anode wires are equidistant from a face of the cathode body and parallel to each other which would be required to be in suitable position for welding to the typical lead frame.

There has been a long-standing need for improvements in capacitor manufacture, particularly when the anode comprises multiple anode wires. Provided herein is an improved process for forming capacitors and an improved capacitor formed thereby.

SUMMARY OF THE INVENTION

The invention relates to an improved process for the formation of a capacitor and an improved capacitor formed thereby.

A particular advantage of the improved process is the ability to form a capacitor comprising multiple anode wires without damage to the anode, the interface between the anode body and anode wires, or anode wires during formation and, especially, during welding to the lead frame.

An embodiment of the invention is provided in a capacitor. The capacitor comprises a capacitor body comprising an anode, a dielectric on the anode and a cathode on the dielectric. At least two anode wires are in electrical contact with the anode and extend from the capacitor body. An individual anode node is welded to each of the multitude of anode wires. An encapsulant is formed over the capacitor body wherein a portion of the encapsulant is diced to expose a portion of the anode node, forming an anode node remnant. A metallization is formed on a portion of the encapsulant and at least a portion of the anode node remnant so that the metallization forms a terminal on the encapsulant surface in electrical contact with the anode node remnant.

Yet another embodiment of the invention is provided in a capacitor comprising a capacitor body comprising an anode, a dielectric on the anode and a cathode on the dielectric. At least two anode wires are in electrical contact with the anode and extend from the capacitor body. An individual anode node is welded to each of the anode wires. The cathode portion of the capacitor body is attached to a cathode portion of a leadframe with, preferably but not limited to, a conductive adhesive. The anode nodes are in proximity to the anode portion of the leadframe, a conductive paste is present between the anode node and leadframe, such that the paste forms an electrical connection between the anode nodes and leadframe. A suitable paste is a material that can fill the gaps between each anode node and the leadframe, that vary in distance due to manufacturing tolerances. The paste can be formed of a metal filled adhesive or other electrically conducting paste that when applied allows for assembly of the capacitor components followed by curing to form a permanent bond. The paste may also be formed from solder within a resin flux, wherein the solder paste is heated to bond to the anode nodes and leadframe. It would also be preferable to use a solid solder to form the connection between in the anode node and leadframe. In that embodiment the solder is liquified, typically by heating, such that it wets the anode node and leadframe surfaces. The liquid form of the solder satisfies the benefit due to the liquid state conforming to the variable gap between each anode node and the leadframe.

Yet another embodiment of the invention is provided in a capacitor comprising a capacitor body comprising an anode, a dielectric on the anode and a cathode on the dielectric. At least two anode wires in electrical contact with the anode and extending from the capacitor body. A single anode node is welded to each of the plurality of anode wires, wherein the anode node is a material that is compliant to the individual planes for each anode wire. Preferably this anode node would be made from a material wherein the properties support the compliance. An example of this is the use of a metal wire material that requires less force to deform from one anode wire to the next anode wire, than would damage the fragile interface between the anode wire and anode body. While a wire is presented in this embodiment other forms of the anode node material in shape and material could be used to achieve the lower deformation force required to not to damage the capacitor body. Anode wires include, but are not limited to, a ribbon, variable diameter wire, or composite materials. An encapsulant is formed over the capacitor body wherein a portion of the encapsulant is diced to expose a portion of the anode node, forming an anode node remnant.

A metallization formed on a portion of the encapsulant and at least a portion of the anode node remnant so that the metallization forms a terminal on the encapsulant surface in electrical contact with the anode node remnant.

Yet another embodiment of the invention is provided in a capacitor comprising a capacitor body comprising an anode, a dielectric on the anode and a cathode on the dielectric. At least two anode wires in electrical contact with the anode and extending from the capacitor body. A single anode node is welded to each of the plurality of anode wires, wherein the anode node is a material that is compliant to the individual planes for each anode wire. The cathode portion of the capacitor body attached to a cathode portion of a leadframe with, preferably but not limited to, a conductive adhesive. The anode node is in proximity to the anode portion of the leadframe, a conductive paste is present between the anode node and leadframe, such that the paste forms an electrical connection between the anode nodes and leadframe.

Yet another embodiment is provided in a capacitor. The capacitor comprises a capacitor body comprising an anode, a dielectric on the anode and a cathode on the dielectric. At least two anode wires are in electrical contact with the anode and extending from the capacitor body. At least one anode node, or an anode node remnant, wherein each anode wire of the anode wires is in electrical contact with at least one anode node or anode node remnant. An encapsulant encases the capacitor body. At least a portion of the anode node, or anode node remnant, is in electrical connection with an external termination. A cathode external termination is in electrical contact with the cathode.

Yet another embodiment is provided in a method of forming a capacitor. The method includes:

forming a capacitor body comprising an anode, a dielectric on the anode and a cathode on the dielectric with at least two anode wires in electrical contact with the anode and extend from the capacitor body; electrically connecting at least one anode node to each anode wire of the anode wires; encapsulating the capacitor body and at least a portion of the anode node wires and anode nodes;

forming a metallization layer on a surface of the encapsulant wherein the metallization layer is in electrical contact with each anode node and wherein the metallization layer is an external termination; and forming a cathode external termination in electrical contact with the cathode.

DESCRIPTION

The present invention is related to an improved process for manufacturing a capacitor and an improved capacitor formed thereby. More specifically, the present invention is related to a process for forming a capacitor comprising multiple anode wires wherein each anode wire is in electrical contact with the external termination without the necessity of wire bending or distortion, or disturbing the interface between the anode body and the anode wires, to create contact with an external termination. Even more specifically, the present invention is related to the use of at least one anode node wherein the capacitor body is diced, to expose the anode node or a remnant thereof, followed by metallization to form an external termination in direct electrical contact with the anode node.

The invention will be described with reference to the figures which are integral, but non-limiting, part of the specification provided for clarity of the invention. Throughout the various figures similar elements will be numbered accordingly.

Figure 1:
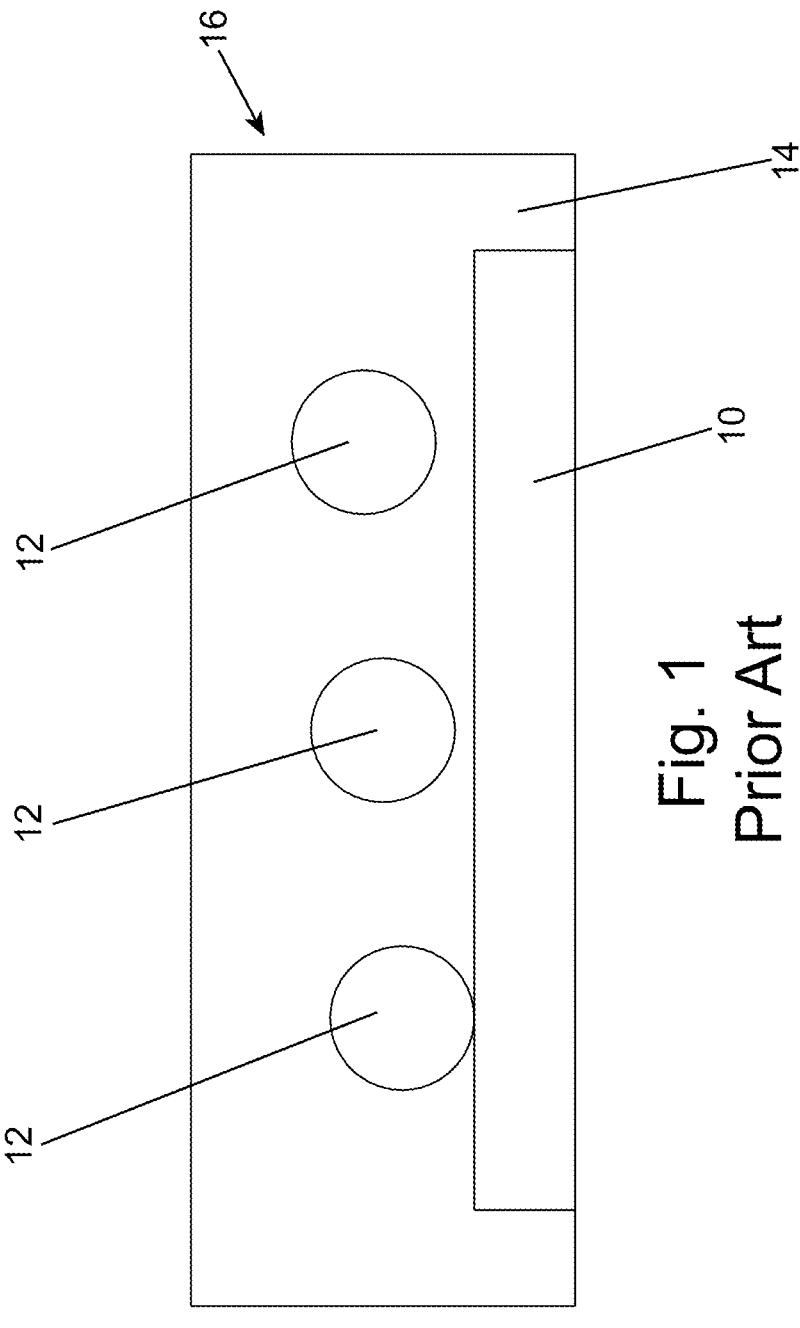
FIG. 1 is a schematic end view of a prior art embodiment.
Figure 2:
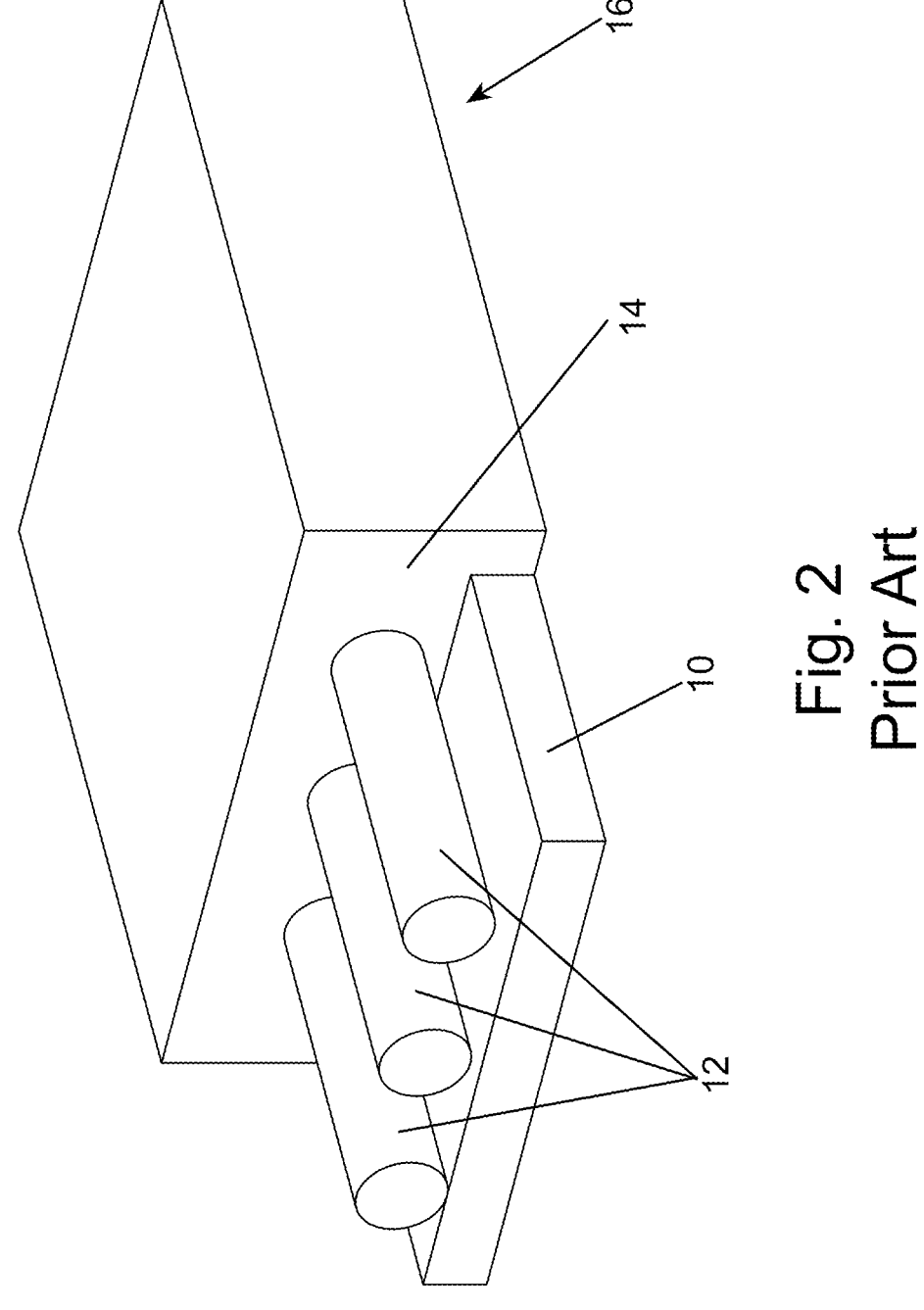
FIG. 2 is a schematic perspective view of a prior art embodiment.
Figure 3:
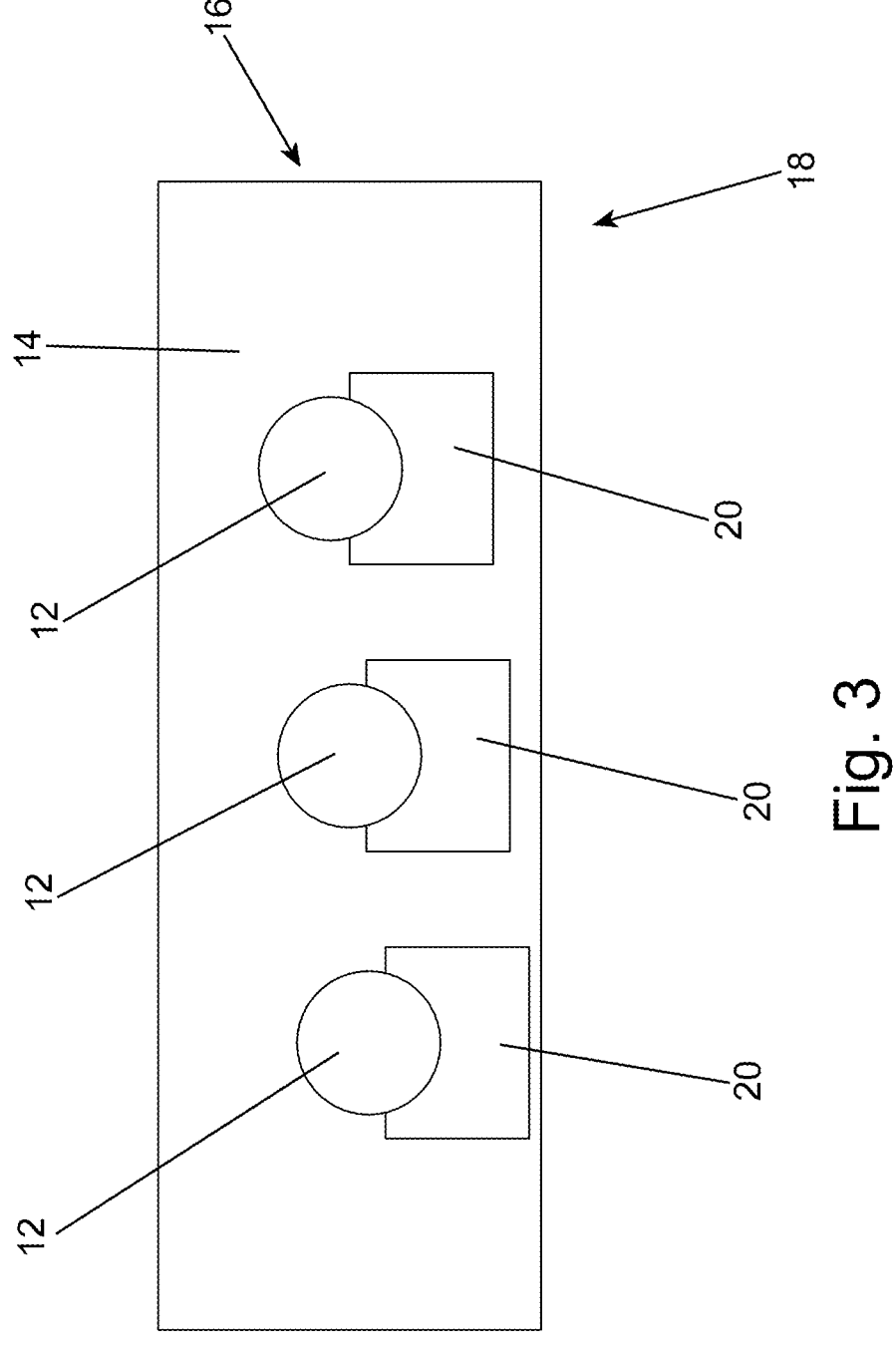
FIG. 3 is a schematic end view of an embodiment of the invention.

An embodiment of the invention will be described with reference to FIG. 3. In FIG. 3 a capacitor precursor, is illustrated schematically. For the purposes of the invention a capacitor precursor is a capacitor body, optionally encapsulated, which has not been externally terminated on the anode side. The capacitor precursor, 18, comprises a capacitor body, 16, with at least two anode wires, 12, optionally co-planar anode wires, extending from a common face, 14, of the anode of the capacitor body. At least one anode node, 20, is attached to the anode wires preferably by welding.

The number of anode wires is only limited by the amount of surface area required to include additional anode wires. As would be understood to those of skill in the art, it is desirable to have as large an overlap area of anode and cathode as possible since this is advantageous for capacitance. Each anode wire occupies a portion of the face of the capacitor body and that portion is not suitable for forming a cathode since the cathode and anode cannot be in electrical contact. Therefore, increasing the number of anode wires necessarily decreases the available surface area on the capacitor body for cathode coverage. In practice the number of anode wires is at least 2 to no more than about 10. More preferably, the number of anode wires is about 3 to about 5. While not limited thereto, it is preferable that the anode wires be parallel in an embodiment and preferably approximately coplanar in an embodiment.

Figure 4:
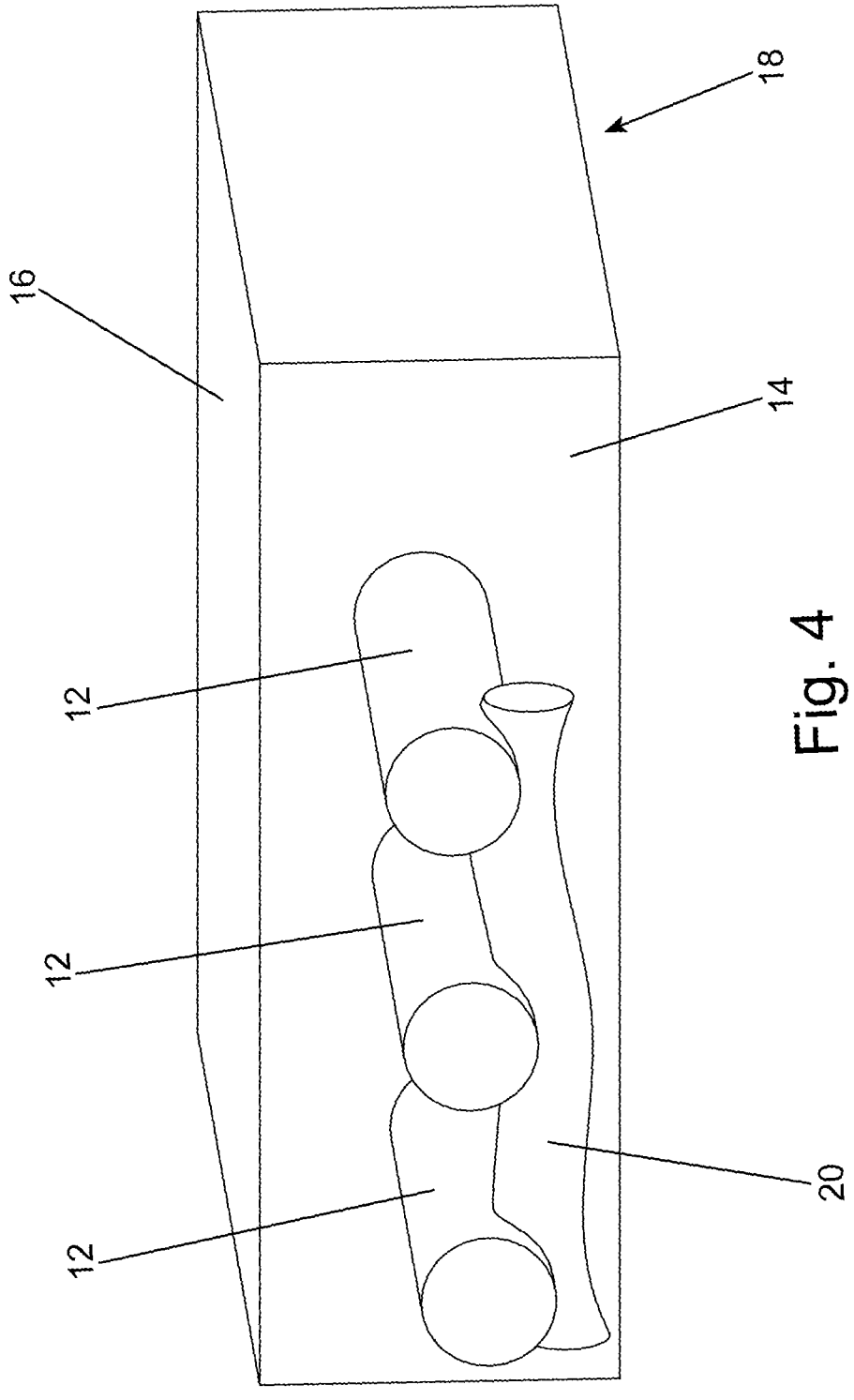
FIG. 4 is a perspective schematic view of an embodiment of the invention.

An embodiment of the invention will be described with reference to FIG. 4. In FIG. 4 a capacitor precursor, is illustrated schematically wherein the anode node, 20, is a flexible anode node which is in contact with multiple anode wires, 12, and preferably all anode wires without limit thereto.

Figure 5:
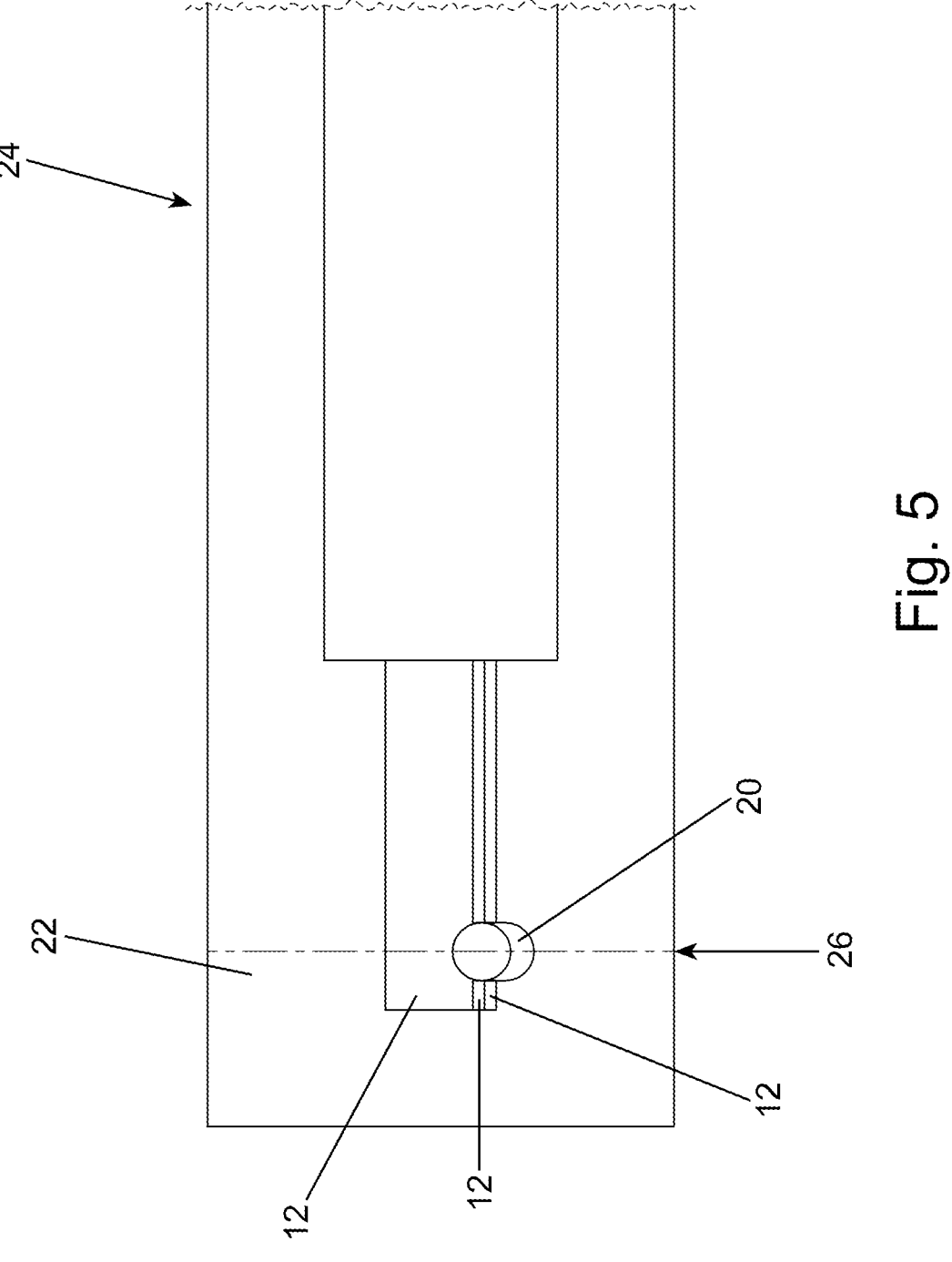
FIG. 5 is a schematic cross-sectional view of an embodiment of the invention.
Figure 6:
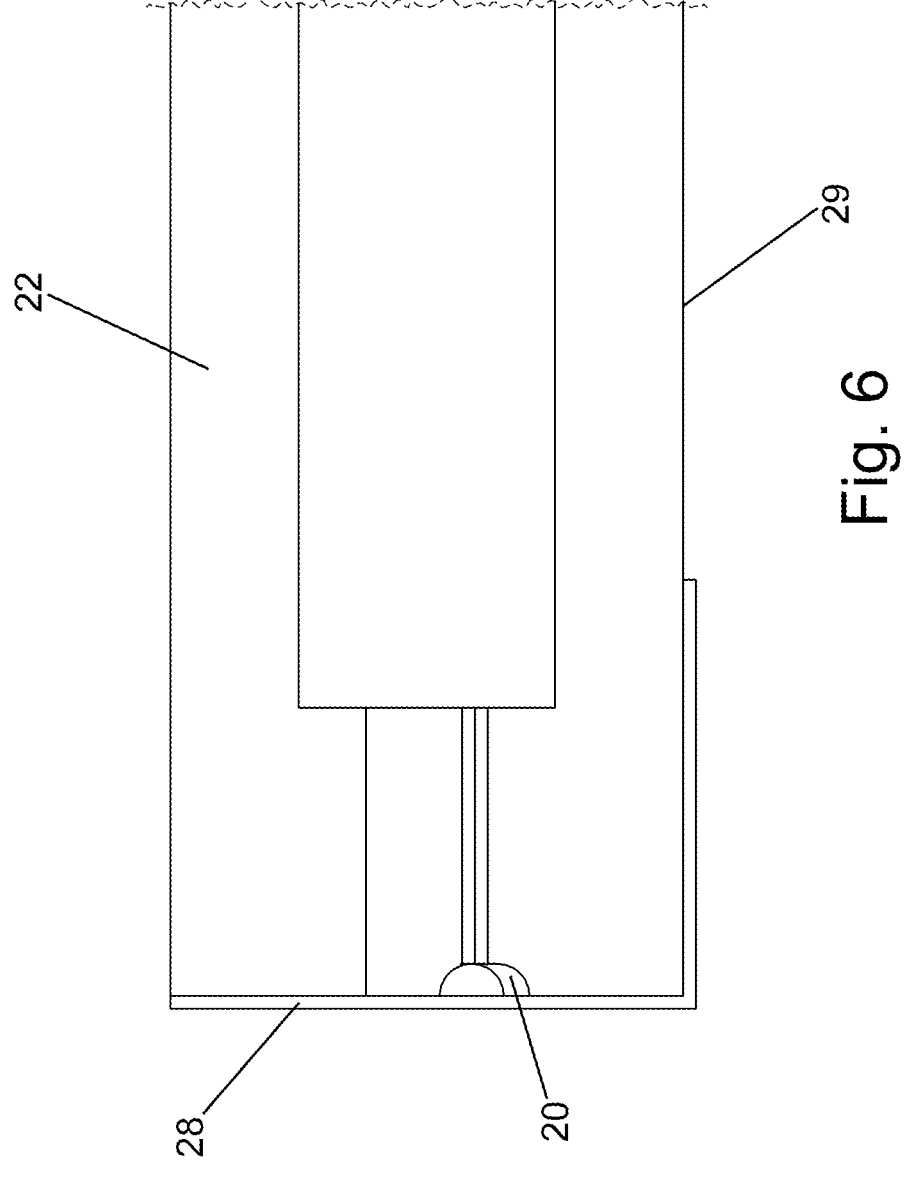
FIG. 6 is a schematic cross-sectional view of an embodiment of the invention.

An embodiment of the invention will be described with reference to FIG. 5. In FIG. 5 the capacitor precursor of FIG. 4 is encased in an encapsulant, 22, including at least partially encasing the anode wires, 12, and anode node, 20, illustrated as a flexible node in contact with all anode wires for convenience without limit thereto, to form an encapsulated capacitor precursor, 24. The encapsulated capacitor precursor is diced at 26, to expose at least a portion of the anode node or anode nodes. With reference to FIG. 6, a metal termination, 28, is formed by metallizing the exposed face thereby forming a metal bond with the exposed portion of the anode node thereby forming an electrical connection, preferably a direct electrical connection, to the anode node and an electrical connection to the anode wires preferably at least through the anode node. The cathode termination is not illustrated in FIGS. 5 and 6. The metal termination may extend to side face, 29, of the capacitor body to facilitate mounting to a trace of a substrate or circuit board.

Figure 7:
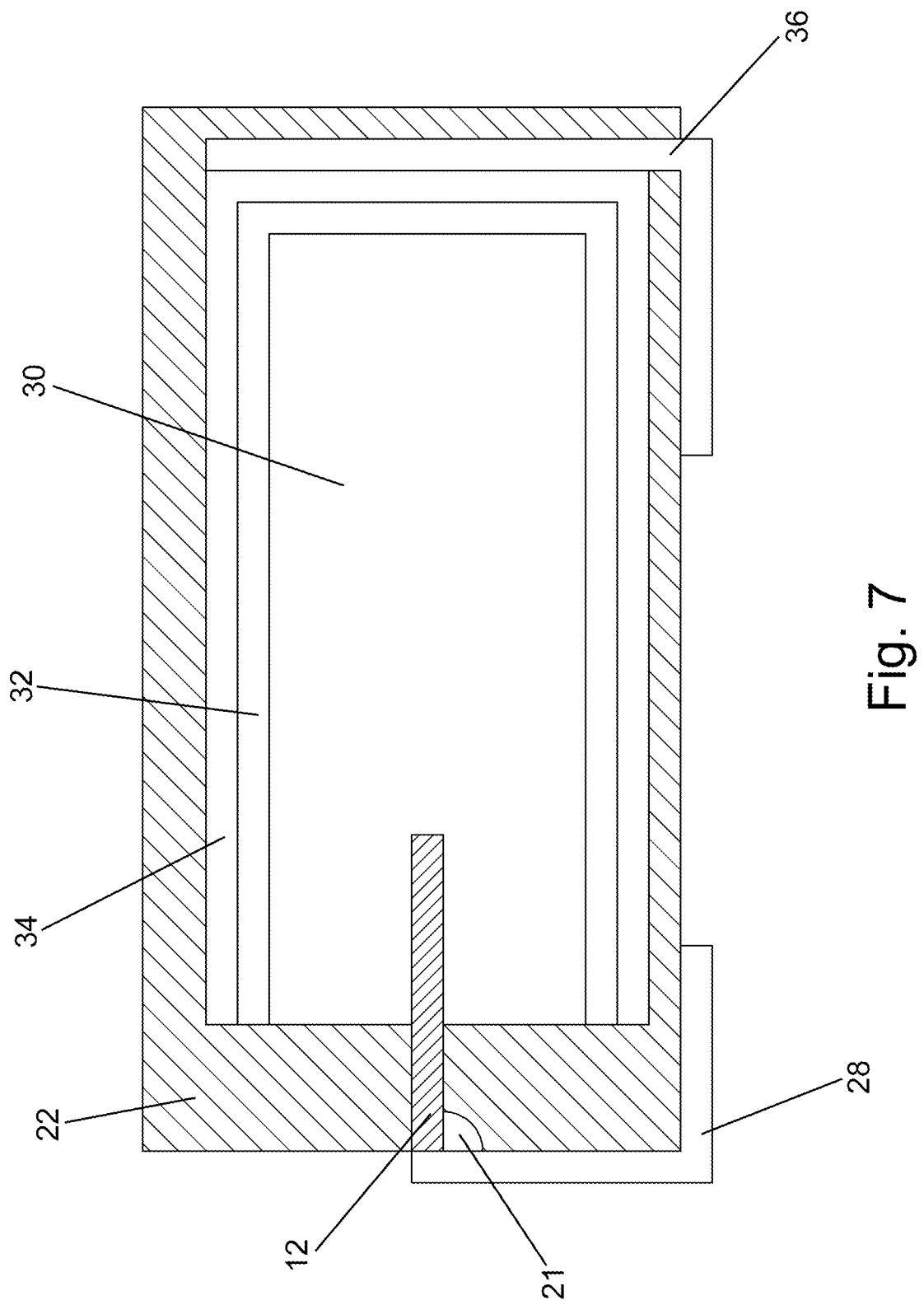
FIG. 7 is a schematic cross-sectional view of an embodiment of the invention.

An embodiment of the invention is illustrated in schematic cross-sectional side view in FIG. 7. In FIG. 7, the capacitor body comprises an anode, 30, a dielectric, 32, on the anode and a cathode, 34, on the dielectric with the understanding that the cathode and anode are not in electrical contact. Multiple anode wires, 12, extend from the anode. The anode node remnant, 21, which is that portion of the anode node remaining after dicing, is in electrical contact with at least one anode wire and in electrical contact with an external termination, 28, which is described previously. A cathode external termination, 36, is in electrical contact with the cathode. An encapsulant, 22, encases the capacitor body with at least a portion of the external termination, 28, and the cathode external termination, 36, extending beyond the encapsulation to allow for electrical connection to a circuit trace.

Figure 8:
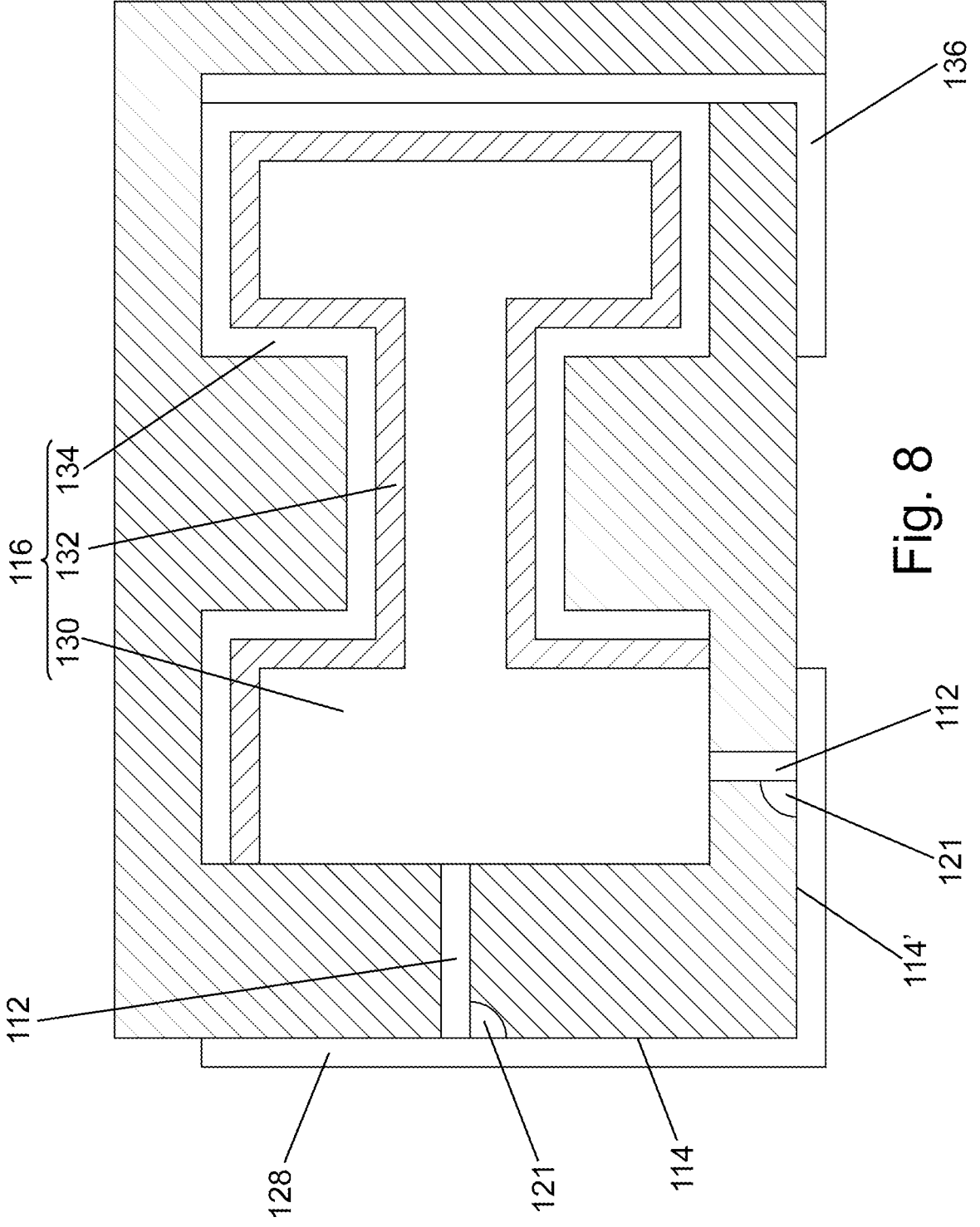
FIG. 8 is a schematic cross-sectional view of an embodiment of the invention.

A particular feature of the instant invention is the ability to utilize multiple anode wires which are not extending from a common face and not necessarily parallel or coplanar. An embodiment of the invention will be described with reference to FIG. 8 wherein a capacitor is illustrated in cross-sectional schematic view. In FIG. 8, a capacitor body, 116, is illustrated wherein the capacitor body comprises a fluted anode, 130, with a dielectric, 132, on at least a portion of the fluted anode and a cathode, 134, on at least a portion of the dielectric. Anode wires, 112, extend from the anode, optionally from different faces, and are either attached to the anode or embedded in the anode. Anode node remnants, 121, in electrical contact with an anode wire and an external termination, 128, is preferably formed by metallization of an end face, 114, or side face, 114', after dicing as would be realized from the descriptions herein. A cathode lead, 136, is in electrical connection with the cathode.

The anode is a conductor. A preferred anode is a metal and preferably a valve metal selected from the group consisting of tantalum, aluminum, niobium, titanium, zirconium, hafnium, alloys of these elements, and a conductive oxide thereof such as NbO. The anode wires are not particularly limited herein. In an embodiment which is particularly suitable for demonstration of the invention the anode wires comprise the same metal as the anode.

The dielectric is not particularly limited herein. An oxide of the anode material is a particularly suitable dielectric, without limit thereto, due to the well-established use thereof in the art and manufacturing convenience.

The cathode layers are not limited herein and are consistent with those commonly found in the capacitor industry including cathode layers comprising conductive polymer, or manganese dioxide, on the dielectric. The conductive polymer layer can be formed by many methods known in the art such as, in situ polymerization, one pot polymerization, electrochemical polymerization, or prepolymerized polymer dips. Particularly preferred conductive polymers are polyanilines, polypyrroles, polythiophenes and derivatives thereof. A preferred polymer for demonstration of the invention is poly-3,4-ethylenedioxythiophene or derivatives thereof. Additional cathode layers are preferably formed on the conductive polymer layer or manganese dioxide layer to facilitate connecting of the cathode external termination thereto with carbon containing layers and metal containing layers being particularly suitable for demonstration of the invention.

Metallization on a surface is well known in the art and not particularly limited herein. Metallization is typically accomplished by a method selected from plating, sputtering, deposition, sintering, diffusion, coating, and applying a conductive material, preferably a metal. The metallization may be a single metal, an alloy, or a sequential series of metals to achieve adequate electrical conductivity. The metal used for metallization is not particularly limited with the proviso that the metallization is solderable and forms an electrical connection, and preferably a metallurgical bond, to the anode node. Particularly preferred for metallization is copper.

The anode node is a material which can be welded to the anode wire and, after exposure, metallized to form the external termination. It would be preferred that the node material is compatible with the metallization method chosen for a given design. A typical metallization would be copper plating, wherein it would be preferred that the node material comprise copper or copper alloy. Other material can be suitable for this method including aluminum. Other metallization techniques such as sputtering, flame spray, or vapor/chemical deposition can be used and would warrant a node material compatible with the chosen process.

The invention has been described with reference to the preferred embodiments without limit thereto. One of skill in the art would realize additional embodiments and improvements which are not specifically stated but which are within the meets and bounds of the claims appended hereto.

The invention claimed is:

1. A capacitor comprising:
a capacitor body comprising an anode, a dielectric on said anode and a cathode on said dielectric;
at least two anode wires in electrical contact with said anode and extending from said capacitor body;
at least one anode node or an anode node remnant, wherein each anode wire of said anode wires is in electrical contact with said at least one said anode node or said anode remnant with one separate anode node in electrical contact with each said anode wire;
an encapsulant encasing said capacitor body;
at least a portion of each said at least on anode node or anode node remnant, is in electrical connection with an external termination; and
a cathode external termination in electrical contact with said cathode.

2. The capacitor of claim 1 wherein said external termination is a metallization layer on said encapsulant wherein said metallization layer is in electrical contact with each said anode node or anode node remnant wherein said metallization layer is an external termination.

3. The capacitor of claim 1 wherein said external termination is a leadframe portion.

4. The capacitor of claim 1 wherein said electrical connection to said external termination comprises a conductive paste, solder, or other conforming conductive material.

5. The capacitor of claim 1 wherein said anode comprises a metal.

6. The capacitor of claim 5 wherein said metal is a valve metal selected from the group consisting of tantalum, aluminum, niobium, titanium, zirconium, hafnium, alloys thereof and a conductive oxide thereof.

7. The capacitor of claim 1 wherein said anode is fluted.

8. The capacitor of claim 1 wherein said cathode comprises manganese dioxide or a conductive polymer.

9. The capacitor of claim 8 wherein said conductive polymer is selected from a polyaniline, a polypyrrole or a polythiophene.

10. The capacitor of claim 9 wherein said polythiophene is poly-3,4-ethylenedioxythiophene.

11. The capacitor of claim 1 comprising one anode node in electrical contact with multiple said anode wires.

12. The capacitor of claim 1 comprising no more than 10 said anode wires.

13. The capacitor of claim 12 comprising 3 to 5 said anode wires.

14. The capacitor of claim 1 wherein said anode wires are parallel.

15. The capacitor of claim 1 wherein said anode wires are coplanar.

16. The capacitor of claim 1 wherein said anode wires extend from a common face of said capacitor body.

17. The capacitor of claim 1 wherein said anode wires do not extend from a common face of said capacitor body.

18. A method of forming a capacitor comprising:

forming a capacitor body comprising an anode, a dielectric on said anode and a cathode on said dielectric with at least two anode wires in electrical contact with said anode and extending from said capacitor body and with one separate anode node in electrical contact with each said anode wire;

electrically connecting each said at least one anode node to each anode wire of said anode wires and to an external termination; encapsulating said capacitor body and at least a portion of said anode wires and anode nodes, forming a metallization layer, wherein said metallization layer is in electrical contact with each said anode node wherein said metallization layer is an external termination; and forming a cathode external termination in electrical contact with said cathode.

19. The method of forming a capacitor of claim 18 further comprising forming an encapsulant encasing said capacitor body wherein said metallization layer is on encapsulant surface.

20. The method of forming a capacitor of claim 18 wherein said anode comprises a metal.

21. The method of forming a capacitor of claim 20 wherein said metal is a valve metal selected from the group consisting of tantalum, aluminum, niobium, titanium, zirconium, hafnium, alloys thereof and a conductive oxide thereof.

22. The method of forming a capacitor of claim 18 wherein said anode is fluted.

23. The method of forming a capacitor of claim 18 wherein said cathode comprises manganese dioxide or a conductive polymer.

24. The method of forming a capacitor of claim 18 wherein said cathode comprises manganese dioxide or a conductive polymer.

25. The method of forming a capacitor of claim 24 wherein said conductive polymer is selected from a polyaniline, a polypyrrole or a polythiophene.

26. The method of forming a capacitor of claim 25 wherein said polythiophene is poly-3,4-ethylenedioxythiophene.

27. The method of forming a capacitor of claim 18 comprising one anode node in electrical contact with multiple said anode wires.

28. The method of forming a capacitor of claim 18 comprising no more than 10 said anode wires.

29. The method of forming a capacitor of claim 28 comprising 3 to 5 said anode wires.

30. The method of forming a capacitor of claim 18 wherein said anode wires are parallel.

31. The method of forming a capacitor of claim 18 wherein said anode wires are coplanar.

32. The method of forming a capacitor of claim 18 wherein said anode wires extend from a common face of said capacitor body.

33. The method of forming a capacitor of claim 18 wherein said anode wires do not extend from a common face of said capacitor body.

34. A capacitor comprising:

a capacitor body comprising an anode, a dielectric on said anode and a cathode on said dielectric;

at least two anode wires in electrical contact with said anode and extending from said capacitor body;

at least one anode node or an anode node remnant, wherein each anode wire of said anode wires is in electrical contact with said at least one said anode node or said anode remnant;

an encapsulant encasing said capacitor body;

at least a portion of said at least on anode node or anode node remnant, is in electrical connection with an external termination; and a cathode external termination in electrical contact with said cathode wherein at least one said anode node is a flexible anode node.

35. The capacitor of claim 34 wherein said flexible anode node is in electrical contact with multiple said anode wires.

36. The capacitor of claim 34 wherein said flexible anode node is in electrical contact with all said anode wires.

37. A method of forming a capacitor comprising:

forming a capacitor body comprising an anode, a dielectric on said anode and a cathode on said dielectric with at least two anode wires in electrical contact with said anode and extending from said capacitor body;

electrically connecting at least one anode node to each anode wire of said anode wires: encapsulating said capacitor body and at least a portion of said anode wires and anode nodes, forming a metallization layer, wherein said metallization layer is in electrical contact with each said anode node wherein said metallization layer is an external termination; and forming a cathode external termination in electrical contact with said cathode wherein at least one said anode node is a flexible anode node.

38. The method of forming a capacitor of claim 37 wherein said flexible anode node is in electrical contact with multiple said anode wires.

39. The method of forming a capacitor of claim 37 wherein said flexible anode node is in electrical contact with all said anode wires.

40. A method of forming a capacitor comprising:

forming a capacitor body comprising an anode, a dielectric on said anode and a cathode on said dielectric with at least two anode wires in electrical contact with said anode and extending from said capacitor body;

electrically connecting at least one anode node to each anode wire of said anode wires; encapsulating said capacitor body and at least a portion of said anode wires and anode nodes, forming a metallization layer, wherein said metallization layer is in electrical contact with each said anode node wherein said metallization layer is an external termination; and forming a cathode external termination in electrical contact with said cathode further comprising dicing said capacitor prior to said forming said metallization wherein said dicing forms at least one anode node remnant and said metallization is in electrical contact with said anode node remnant.

* * * * *